UNITED STATES PATENT OFFICE.

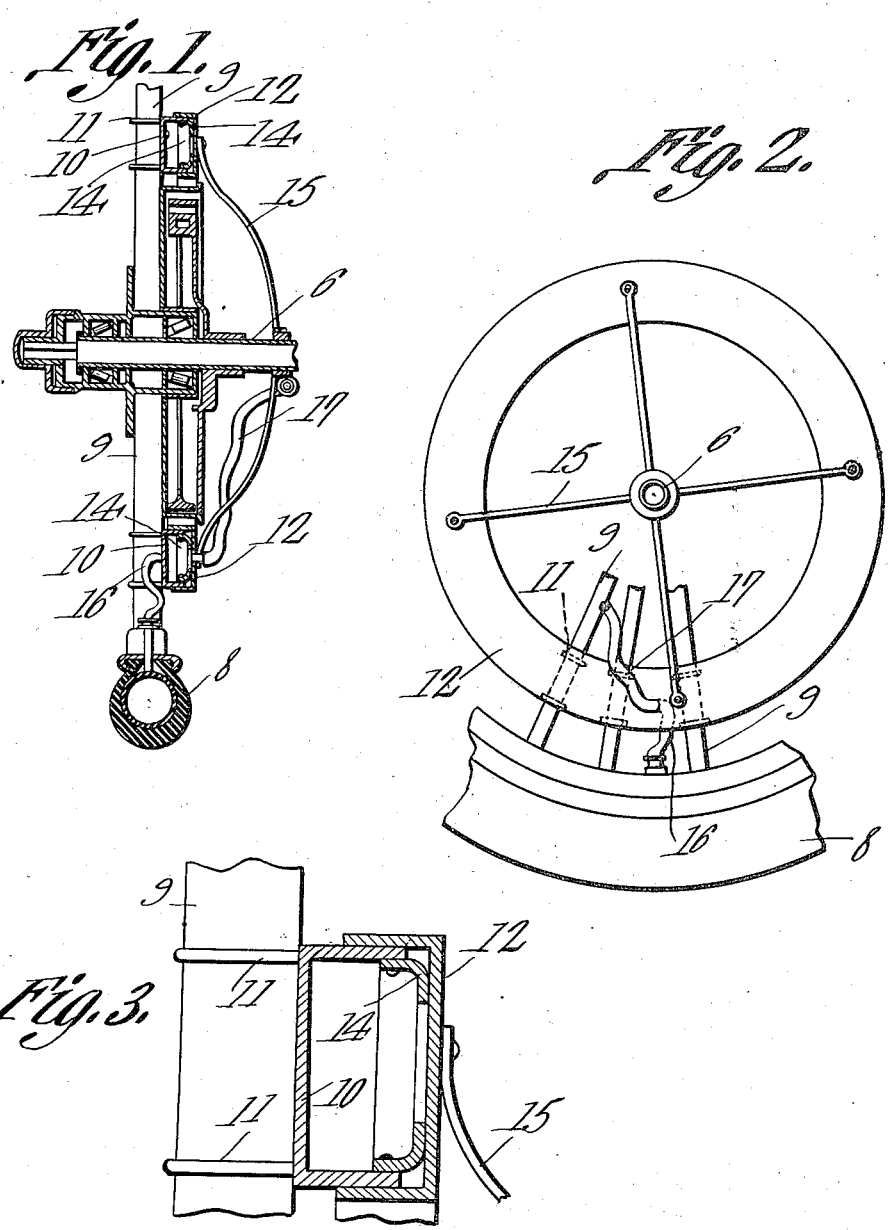

ROYAL L. FOSTER, OF FORT RILEY, KANSAS.

TIRE-INFLATION MECHANISM.

1,026,667.  Specification of Letters Patent.  Patented May 21, 1912.

Application filed November 26, 1910. Serial No. 594,350.

*To all whom it may concern:*

Be it known that I, ROYAL L. FOSTER, a citizen of the United States, residing at Fort Riley, in the county of Geary and State of Kansas, have invented a new and useful Tire-Inflation Mechanism, of which the following is a specification.

It is the object of this invention, broadly speaking, to provide a transfer of novel construction, supplying air immediately to the tires of vehicle wheels.

With the foregoing and other objects in view which will appear as the description proceeds, the invention resides in the combination and arrangement of parts and in the details of construction hereinafter described and claimed, it being understood that changes in the precise embodiment of invention herein disclosed can be made without departing from the spirit of the invention.

In the drawings, Figure 1 is a fragmental section of one of the wheels of the vehicle, showing the manner in which the transfer is mounted upon the wheel and its supporting axle; Fig. 2 is an elevation of one of the wheels, parts being broken away; and Fig. 3 is a section of the transfer, enlarged from Fig. 1.

In the drawings, a movable axle end is shown at 6, the tire being denoted by the numeral 8.

The numeral 9, denotes the spokes of the wheel.

To the wheels of the vehicle, the transfer mechanism is connected. This transfer mechanism includes an inner, trough-like annular member 10, secured by means of clips 11, of any desired construction, to the spokes 9 of the wheel. This transfer mechanism is identical in all the wheels of the vehicle, and a description of one wheel and its transfer mechanism, will suffice for all.

The walls of the inner, spoke-supported member 10 are inclosed by the walls of the outer annular member 12. To the edges of the inner annular member 10, flexible valve strips 14 are secured, as clearly seen in Fig. 3, these valves being adapted to bear against the inner face of the outer annular member 12, to avoid a leakage of air between the members 10 and 12. The outer annular member 12 is supported by means of a spider 15, upon the movable axle end 6. The construction of the device is such that the inner member 10 of the transfer rotates with the wheel, the outer member 12 of the transfer being rigidly held upon the axle end 6, by means of the spider 15. A pipe 16 leads from the inner member 10 of the transfer, to the tire 8, this pipe 16 preferably passing through the felly of the wheel. Another pipe 17 leads from the outer member 12 of the transfer, to the air supply.

In practical operation, the trough-shaped secondary member 10 will rotate within the primary trough-shaped member 12, the secondary member 10 moving with the wheel, and the primary member 12 being fixed upon the axle 6, by the spider 15. Air will be supplied within the transfer mechanism, through the instrumentality of the pipe 17, and by way of the pipe 16, the air will find its way from the transfer into the tire 8. The members 10 and 12 have relative transverse movement, since the side walls of the member 12 are spaced from the spokes 9, the side walls of the member 10 being spaced from the end wall of the member 12, as Fig. 3 will clearly show. Thus, any inequalities resulting from an improper fit of the wheel upon the axle, will be accommodated. Owing to the fact that the valve strips 14 are curved, so as to lie against the end wall of the primary member 12, an unusually tight joint is effected, the construction being such that when there is fluid pressure within the transfer, there will be no leakage between the members 10 and 12. Moreover, owing to the fact that the valve strips 14 are curved so as to lie against the end wall of the member 12, transverse movement between the members 10 and 12, will not be interfered with, by the presence of the valve strips.

Having thus described the invention, what is claimed is:—

The combination with an axle and a wheel thereon, having spokes and a rim, of a spider secured to the axle; an annular, trough-shaped primary member secured to the extremities of the spider; an annular, trough-shaped secondary member fitting within the primary member for rotation and for transverse movement; clips securing the secondary member to the spokes; flexible valve strips secured each along one edge of the side walls of the secondary member and curved to lie at their free edges against the end wall of the primary member; a pipe entering the end wall of the secondary member and extended through the rim, into the tire; and a pipe entering the end wall of the primary member, and adapted for connection with a source of fluid pressure supply.

In testimony that I claim the foregoing as my own, I have hereto affixed my signature in the presence of two witnesses.

ROYAL L. FOSTER.

Witnesses:
CHARLES E. KLEPPER,
ALBERT E. ROSS.